(12) United States Patent
Ahn et al.

(10) Patent No.: US 12,494,472 B2
(45) Date of Patent: Dec. 9, 2025

(54) METHOD FOR MANUFACTURING ELECTRODE FOR LITHIUM SECONDARY BATTERY

(71) Applicant: SEOUL NATIONAL UNIVERSITY R&DB FOUNDATION, Seoul (KR)

(72) Inventors: Kyung Hyun Ahn, Seoul (KR); Hye Jung Youn, Gyeonggi-do (KR); Min Hwan Jeong, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 608 days.

(21) Appl. No.: 17/802,238

(22) PCT Filed: Feb. 18, 2021

(86) PCT No.: PCT/KR2021/002063
§ 371 (c)(1),
(2) Date: Aug. 25, 2022

(87) PCT Pub. No.: WO2021/172809
PCT Pub. Date: Sep. 2, 2021

(65) Prior Publication Data
US 2023/0078014 A1  Mar. 16, 2023

(30) Foreign Application Priority Data
Feb. 28, 2020 (KR) ........................ 10-2020-0024951

(51) Int. Cl.
*H01M 4/04* (2006.01)
*H01M 4/02* (2006.01)
(Continued)

(52) U.S. Cl.
CPC ........... *H01M 4/043* (2013.01); *H01M 4/131* (2013.01); *H01M 4/133* (2013.01); *H01M 4/134* (2013.01);
(Continued)

(58) Field of Classification Search
CPC .................. H01M 4/043; H01M 4/04
See application file for complete search history.

(56) References Cited

U.S. PATENT DOCUMENTS 7,629,071 B2 * 12/2009 Liu .................... H01M 8/0245
428/408
2011/0176255 A1   7/2011 Sasaki et al.
(Continued)

FOREIGN PATENT DOCUMENTS

JP         2006216288 A   *   8/2006
JP         2013-073685 A       4/2013
(Continued)

OTHER PUBLICATIONS

Office Action from corresponding Korean Patent Application No. 10-2020-0024951 dated Aug. 4, 2000.
(Continued)

*Primary Examiner* — Robert S Carrico
*Assistant Examiner* — Jade Serena Simmons
(74) *Attorney, Agent, or Firm* — Christensen, Fonder, Dardi PLLC; Diane E. Bennett; Peter S. Dardi

(57) ABSTRACT

The present invention relates to a method for manufacturing an electrode for a lithium secondary battery, wherein, at the time of manufacturing of an electrode for a lithium secondary battery, a drying speed can be reduced through the steps of: applying a dewatering process using a porous substrate to remove a considerable amount of solvent from electrode slurry in advance; performing pressurization in a state of the porous substrate, an electrode layer, and an electrode current collector; performing additional dewatering; and separating the porous substrate from the electrode layer and then drying the electrode layer, and thus the electrode productivity can be maximized without degradation of electrode performance.

15 Claims, 3 Drawing Sheets

(51) Int. Cl.
*H01M 4/131* (2010.01)
*H01M 4/133* (2010.01)
*H01M 4/134* (2010.01)
*H01M 4/139* (2010.01)
*H01M 10/052* (2010.01)

(52) U.S. Cl.
CPC ......... *H01M 4/139* (2013.01); *H01M 10/052* (2013.01); *H01M 2004/021* (2013.01); *H01M 2004/027* (2013.01); *H01M 2004/028* (2013.01); *H01M 2220/20* (2013.01)

(56) References Cited

U.S. PATENT DOCUMENTS

| | | | |
|---|---|---|---|
| 2015/0089831 A1 | 4/2015 | Jang et al. | |
| 2015/0111106 A1* | 4/2015 | Son | H01M 4/505 429/223 |
| 2015/0380733 A1* | 12/2015 | Lee | H01M 4/1395 429/218.1 |
| 2017/0149048 A1* | 5/2017 | Takahata | H01M 10/0525 |
| 2019/0319300 A1* | 10/2019 | Yi | H01M 50/491 |
| 2020/0335766 A1 | 10/2020 | Oh et al. | |

FOREIGN PATENT DOCUMENTS

| | | |
|---|---|---|
| JP | 2016-103402 A | 6/2016 |
| KR | 10-2000-0024833 A | 5/2000 |
| KR | 284892 B1 * | 5/2001 |
| KR | 10-2007-0092385 A | 9/2007 |
| KR | 10-2011-0066154 A | 6/2011 |
| KR | 10-1550487 A | 4/2013 |
| KR | 10-2015-0034973 A | 4/2015 |
| KR | 10-2018-0102390 A | 9/2018 |
| KR | 10-2019-0065153 A | 6/2019 |
| KR | 10-2203515 B1 | 1/2021 |

OTHER PUBLICATIONS

International Search Report from corresponding Patent Application No. PCT/KR2021/002063 dated Jun. 3, 2021.
Kritzer, "Separators for nickel metal hydride and nickel cadmium batteries designed to reduce self-discharge rates", Journal of Power Sources, vol. 137 Issue 2, p. 317-321, (Oct. 29, 2004).
Search Report from corresponding European Patent Application No. 21760236.6 dated Oct. 9, 2024.

* cited by examiner

METHOD FOR MANUFACTURING ELECTRODE FOR LITHIUM SECONDARY BATTERY

CROSS REFERENCE TO RELATED APPLICATIONS

This application is a National Stage filing of PCT Application No. PCT/KR2021/002063 filed Feb. 18, 2021, entitled "Method for Manufacturing Electrode for Lithium Secondary Battery", which claims the benefit of priority based on Korean Patent Application No. 10-2020-0024951 filed on Feb. 28, 2020, the entire disclosure of which is incorporated herein by reference for all purposes.

TECHNICAL FIELD

This application claims the benefit of priority based on Korean Patent Application No. 10-2020-0024951 filed on Feb. 28, 2020, the entire disclosure of which is incorporated herein by reference for all purposes.

The present disclosure relates to a method for manufacturing an electrode for a lithium secondary battery, more specifically, to a method for manufacturing an electrode including a dewatering process.

BACKGROUND ART

With development of and an increase in demand for technologies related to the Fourth Industrial Revolution such as mobile devices and electric vehicles, demand for lithium secondary batteries that are rechargeable and miniaturizable while high capacity is ensured is rapidly increasing.

A lithium secondary battery is formed in a structure with a lithium salt-containing electrolyte impregnated in an electrode assembly including a positive electrode, a negative electrode, and a porous separator for separating the positive electrode and the negative electrode each of which is an electrode coated with an active material on a current collector. The electrode is manufactured by coating a foil-type current collector with slurry containing an electrode material such as an active material, a conductive material, and a binder, drying the same, and forming an active material layer by undergoing a pressing process via roll pressing, wherein the speed is usually known in the level of 50 to 120 m/min.

In order to speed up the electrode manufacturing, an increase in temperature or hot air speed is sometimes involved, but in this case, deterioration in electrode performance may take place due to a phenomenon that binder components in the slurry moves toward the surface and a skinning phenomenon that only the surface is dried.

Accordingly, as an alternative to increase the productivity in the electrode manufacturing without deterioration in electrode performance, the present inventors have noticed that the drying rate may be improved when a dewatering process performed in a paper manufacturing process is applied to the electrode manufacturing and thus took on the study on a method to apply the dewatering process before drying the electrode slurry.

In the case of general paper manufacture, raw materials are uniformly applied onto a mesh type forming fabric to obtain sheet type paper after dewatering the same, and the paper is dried by passing through a high-pressure roll and a dryer. The raw paper material which is applied to the forming fabric in a state mostly made up of water is continuously transferred to a roll press while 95% or more of water is removed through dewatering, and then the remaining water is removed using a high-temperature dryer.

In order to apply the dewatering process to the electrode manufacturing for a secondary battery, a separate member corresponding to the forming fabric is required, and using such the member, dewatering should be performed while preventing the separation of solids from electrode slurry which has a higher solid content than paper. In addition, specific techniques are required to effectively remove the member used for dewatering.

Therefore, the present inventors found a method that may efficiently apply the dewatering process used in the paper manufacturing to the electrode manufacturing for a secondary battery. Based on this, the present inventors completed the present disclosure by realizing a method that may maximize productivity by improving the drying rate during the electrode manufacturing.

DISCLOSURE

Technical Problem

An object of the present disclosure is to provide a method capable of maximizing productivity by improving the drying rate without deterioration in electrode performance during manufacture of an electrode for a lithium secondary battery.

Technical Solutions

Example embodiments of the present disclosure provide a method for manufacturing an electrode, including (S1) applying electrode slurry containing an active material, a binder, a conductive material, and a solvent to one surface of a porous substrate and performing a dewatering process toward an opposite surface of the porous substrate to form an electrode layer, (S2) laminating an electrode current collector on the electrode layer formed on the porous substrate to form a laminate in which the porous substrate, the electrode layer, and the electrode current collector are sequentially laminated and performing additional dewatering by pressing the laminate, and (S3) separating the porous substrate from the electrode layer and drying the electrode layer formed on the current collector.

In addition, example embodiments of the present disclosure provide an electrode manufactured by the method and a lithium secondary battery including the same.

Advantageous Effects

According to example embodiments of the present disclosure, it is possible to maximize productivity of an electrode for a lithium secondary battery without deterioration in electrode performance by applying a dewatering process using a porous substrate to a manufacturing process of the electrode to remove a significant amount of a solvent in electrode slurry in advance and by performing additional dewatering by pressing in a state in which a porous substrate, an electrode layer, and an electrode current collector are laminated, separating the porous substrate from the electrode layer, and then drying the electrode layer to shorten the drying rate.

BEST MODE

Figure 1:
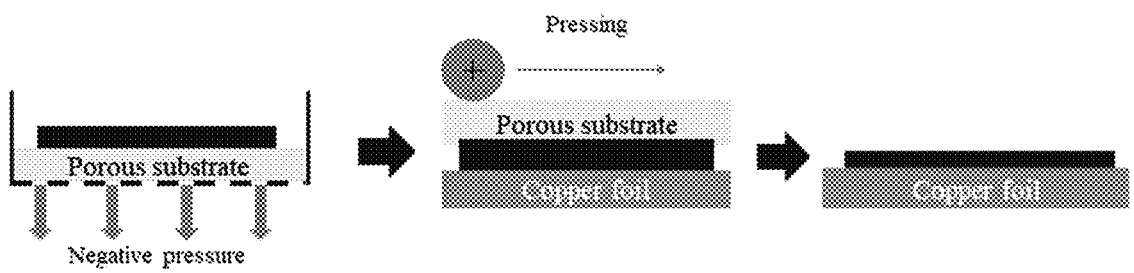
FIG. 1 is a flowchart schematically illustrating an electrode manufacturing process to which a dewatering process according to an example embodiment of the present disclosure is introduced.

Hereinafter, the present disclosure will be described in detail with reference to the drawings. The terms or words used in the present specification and claims should not be limited to and construed to have general meanings or dictionary definitions, and based on a principle that the inventor may properly define the concept of terms in order to best describe her or his invention, the terms or words should be construed as meanings and concepts consistent with the technical idea of the present disclosure.

In addition, since the example embodiments described in the present specification and the configurations illustrated in the drawings are merely the most preferred example embodiment of the present disclosure and do not represent all the technical ideas of the present disclosure, it should be understood that there may be various equivalents and modifications that may be substituted for the same at the time of filing the present application.

FIG. 1 schematically illustrates an electrode manufacturing process to which a dewatering process according to an example embodiment of the present disclosure is introduced.

Referring to FIG. 1, an electrode manufacturing method of an example embodiment of the present disclosure includes (S1) dewatering electrode slurry to form an electrode layer; (S2) forming a laminate including a porous substrate, an electrode layer, and an electrode current collector and pressing the laminate for additional dewatering; and (S3) performing drying after separating the porous substrate.

Hereinafter, the electrode manufacturing method according to an example embodiment of the present disclosure will be described step by step.

First, electrode slurry is applied to one surface of the porous substrate, and then the electrode layer is formed by performing a dewatering process toward the opposite surface of the porous substrate (S1).

The electrode slurry may be obtained by dispersing an active material in a solvent and mixing a binder or a conductive material, followed by stirring.

The active material is a component that causes an electrochemical reaction in the electrode. In the case that the electrode manufactured according to an example embodiment of the present disclosure is used as a positive electrode for a lithium secondary battery, the electrode may include any one active material particle selected from the group consisting of $LiCoO_2$, $LiNiO_2$, $LiMn_2O_4$, $LiCoPO_4$, $LiFePO_4$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg, and Mo, and x, y and z are each independently atomic fraction of oxide composition elements, satisfying $0 \leq x < 0.5$, $0 \leq y < 0.5$, $0 \leq z < 0.5$, and $0 < x+y+z \leq 1$) or a mixture of two or more thereof. On the other hand, in the case that the electrode manufactured according to an example embodiment of the present disclosure is used as a negative electrode for a lithium secondary battery, the active material may include any one active material particle or a mixture of two or more selected from the group consisting of natural graphite, artificial graphite, and carbonaceous materials; lithium-containing titanium composite oxide (LTO) and metal (Me) which is Si, Sn, Li, Zn, Mg, Cd, Ce, Ni, or Fe; alloys composed of Me; oxides (MeOx) of Me; and a complex of Me and carbon. Such the electrode active material may be used in an amount of 10 to 80 wt % based on the total weight of the electrode slurry.

The conductive material is a component that provides a conductive path for electrical connection among electrode materials and is not particularly limited as long as it has conductivity without causing chemical change in a battery. For example, conductive materials may be used, including carbon black such as carbon black, acetylene black, Ketjen-black, channel black, furnace black, lampblack, and thermal black; conductive fibers such as carbon fibers and metal fibers; metal powder such as fluorocarbon, aluminum, and nickel powder; conductive whiskers such as zinc oxide and potassium titanate; conductive metal oxides such as titanium oxide; and polyphenylene derivatives. The conductive material may be added in an amount of 0.1 to 10 wt % based on the total weight of the electrode slurry.

The binder is located between the active material and the conductive material in the electrode layer and is a component that promotes bonding between the electrode layer and the electrode current collector while connecting and fixing the same. Various types of binder polymers may be used, such as polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylic acid, styrene butadiene rubber (SBR), and fluorine-containing rubber. The binder may be added in an amount of 0.1 to 10 wt % based on the total weight of the electrode slurry.

N-methylpyrrolidone, acetone, or water may be used as the solvent.

The content of the active material, the binder, the conductive material, and the solvent included in the electrode slurry may be selected in a range commonly used in the manufacture of an electrode for a lithium secondary battery. For example, liquid electrode slurry having solid content of 10 to 80 wt % may be obtained.

In addition, the electrode slurry may further include other additives such as thickeners and fillers, and the content of the other additives may be appropriately selected within a range that does not deteriorate the performance of the electrode.

On the other hand, in the case of general electrode manufacturing, liquid slurry is directly applied on an electrode current collector, and the solvent is dried, followed by pressing.

In contrast, in the electrode manufacturing method of an example embodiment of the present disclosure, the dewatering process performed in a paper manufacturing process is applied to the manufacturing of an electrode for a lithium secondary battery prior to application of the electrode slurry to the current collector for an electrode.

In the case of general paper manufacturing, a raw material is uniformly applied on a wire mesh type forming fabric and then dewatered to obtain sheet type paper which is then passed through a high temperature to be dried. The raw paper material which is applied to the forming fabric in a state mostly made up of water (concentration of the raw paper material in water is about 1%) is continuously transferred to a roll press and a dryer while 95% or more of water is removed through dewatering.

In order to apply the dewatering process to the electrode manufacturing of a secondary battery, a separate member corresponding to the forming fabric is required, and using the member, dewatering must be performed while the separation of solids from the electrode slurry with higher solid content than paper is prevented.

Therefore, in an example embodiment of the present disclosure, a porous substrate is used as a member for performing the dewatering process for the electrode slurry, and the liquid electrode slurry is applied on the porous substrate and then the dewatering process is performed toward the opposite surface of the porous substrate to remove the solvent in the electrode slurry. In this case, the coating thickness of the liquid electrode slurry may be 100 to 1,000 μm, for example, 300 μm.

The porous substrate used in the dewatering process in an example embodiment of the present disclosure may be in the form of a mesh made of a polymer, glass fibers, paper, metal, or ceramic, but there is no particular limitation on the form and material. Polytetrafluoroethylene (PTFE) and polyethersulfone (PES) may be used as the polymer, and these may be used in a surface-treated form if necessary.

Although the pore size of the porous substrate may vary depending on the type of material, the average size of the pores may be in the range of 0.1 to 20 μm, for example 1 to 10 μm, in order to efficiently perform dewatering of the electrode slurry for a secondary battery containing solids in particle form. When the pore range is satisfied, it is advantageous that only the solvent is able to pass through while the passage of the electrode material of the active material, the binder, and the conductive material is prevented on the porous substrate.

In addition, the porous substrate may have a porosity in the range of 50 to 95%, for example, 70% to 90%, and the porosity may be measured by a method such as mercury intrusion porosimeter (MIP) and Brunauer-Emmett-Teller (BET).

Additionally, the dewatering process may be performed by lowering pressure to a negative pressure for faster and smoother dewatering.

According to the dewatering process, a significant amount of the solvent in the electrode slurry may be removed, for example, to a level of 40% to 80%, specifically 50% to 70%, of the solvent content used therefor. Thus, the duration for drying the electrode layer followed subsequently may be shortened, thereby maximizing productivity of the electrode.

In the electrode manufacturing method of an example embodiment of the present disclosure, after the dewatering process, the electrode current collector is laminated on the electrode layer formed on the porous substrate to form a laminate in which the porous substrate, the electrode layer, and the electrode current collector are sequentially laminated, and the laminate is pressed (S2).

The pressing is a process for additional dewatering of the electrode slurry while increasing the capacity density of the electrode and increasing the adhesion between the electrode current collector and the electrode material and may be performed in a state in which the porous substrate, the electrode layer, and the electrode current collector are sequentially laminated. In addition, the pressing may be performed via a roll pressing method.

In an example embodiment of the present disclosure, the pressing may be performed at a pressure of 0.05 to 20,000 kPa, specifically 0.1 to 4,000 kPa. When the pressing range is satisfied, it is advantageous in that additional dewatering of the electrode slurry may be effectively performed, the capacity density of the electrode is increased, and the adhesion between the electrode current collector and the electrode material is also increased.

In an example embodiment of the present disclosure, the pressing may be performed on a side of the porous substrate of the laminate, and in this case, a surface of the electrode layer in contact with the current collector is increased compared to the porous substrate, which is considered to easily separate and remove the porous substrate from the electrode layer adhered to the current collector in the subsequent step.

The electrode current collector functions as an intermediate medium for supplying electrons provided to an external conductor to the electrode active material or, conversely, as a carrier that collects electrons generated as an outcome of an electrode reaction to be flown to the external conductor. It is not particularly limited as long as high conductivity is secured without causing chemical changes in the battery. For example, the electrode current collector may be stainless steel, aluminum, nickel, titanium, calcined carbon, and copper; stainless steel surface-treated with carbon, nickel, titanium, or silver; aluminum-cadmium alloy; a non-conductive polymer surface-treated with a conductive material; a non-conductive polymer surface-treated with a metal such as aluminum; or a conductive polymer. In addition, the electrode current collector may have various forms, such as a film, a sheet, a foil, a net, a porous body, a foam, and a non-woven fabric body, and the thickness thereof may be in the range of 3 to 500 μm, but is not limited thereto.

In the electrode manufacturing method of an example embodiment of the present disclosure, after pressing, the porous substrate used for dewatering of the electrode slurry is separated and removed, and then the electrode layer formed on the electrode current collector is dried to manufacture an electrode (S3).

The drying is a process for removing the solvent remaining after removal of a significant amount of the solvent in the electrode slurry through the dewatering process performed above and is distinguished from drying that all solvents included in the electrode slurry are removed during manufacturing of existing electrodes. In other words, in the present disclosure, since the dewatering process is performed in advance, drying may be performed at a faster rate than that in the conventional electrode manufacturing process. In addition, the drying temperature may vary depending on the type of solvent included in the electrode slurry.

The shortening of the drying rate may maximize productivity of the electrode and may also resolve a problem caused by raising the temperature or increasing the hot air speed in an attempt to speed up the drying rate in the existing electrode manufacturing process, that is, a phenomenon that the binder component in the slurry moves toward the surface as well as a skinning phenomenon that only the surface is dried, thereby preventing deterioration in electrode performance.

In the electrode manufactured as described above, not only the binder and the conductive material are uniformly distributed along with the active material, but also the average size of the pores among the particles of the conductive material is reduced, thereby enabling the manufacturing of an electrode with the pore size distribution of 0.005 to 60 μm, specifically 0.01 to 45 μm and an average size of 0.25 to 0.29 μm, specifically 0.26 to 0.28 μm.

Accordingly, the electrode manufactured by the method of an example embodiment of the present disclosure exhibits excellent electrode performance in terms of adhesive strength and electrochemical properties, thereby being usefully applied as electrodes for various types of lithium secondary batteries such as stacked, wound, stack-and-fold, and cable types.

For example, in a secondary battery including a positive electrode, a negative electrode, a separator interposed on the positive electrode and the negative electrode, and a non-aqueous electrolyte, at least one of the positive electrode and the negative electrode may be an electrode manufactured by the method of an example embodiment of the present disclosure.

In the secondary battery, any porous substrate commonly used in the art may be used for the separator to separate the negative electrode and the positive electrode. For example, a polyolefin-based porous membrane or a nonwoven fabric may be used. In addition, a porous coating layer including inorganic particles and a binder polymer may further be provided on at least one surface of the porous substrate, but is not particularly limited thereto.

In addition, the non-aqueous electrolyte may include an organic solvent and an electrolyte salt, wherein the electrolyte salt is a lithium salt. As the lithium salt, those commonly used in non-aqueous electrolytes for a lithium secondary battery may be used without limitation.

Such the secondary battery may be used not only in a battery cell used as a power source for a small device but may also be preferably used as a unit cell in a mid-to-large battery module including a plurality of battery cells. Preferred examples of the mid-to-large device include electric vehicles, hybrid electric vehicles, plug-in hybrid electric vehicles, and power storage systems, which may be particularly useful for hybrid electric vehicles and new and renewable energy storage batteries which belong to areas requiring high output.

MODES FOR CARRYING OUT INVENTION

Hereinafter, examples will be described in detail to help the understanding of the present disclosure. However, the example embodiments according to the present disclosure may be modified in various other forms, and the scope of the present disclosure should not be construed as being limited to the following examples embodiments. The example embodiments of the present disclosure are provided to more completely explain the present disclosure to those of ordinary skill in the art.

Example 1: Negative Electrode Manufacturing with Dewatering Process Applied

Negative electrode slurry (solid content: 42.2 wt %) was prepared by adding 40 wt % of natural graphite as an active material, 0.8 wt % of carbon black as a conductive material, 0.7 wt % of styrene-butadiene rubber as a binder, and 0.7 wt % of a thickener (CMC) to the remaining amount of distilled water.

As shown in FIG. 1, the negative electrode slurry was applied, in a thickness of 300 μm, onto a porous substrate (average pore size: 1 μm) made of hydrophilically surface-treated PTFE, and a dewatering process was performed at room temperature toward an opposite surface of the porous substrate to remove distilled water in the slurry. Next, the surface applied with the slurry of the porous PTFE substrate was laminated on one surface of a copper (Cu) thin film which is a negative electrode current collector having a thickness of 10 μm, and then the laminate was pressed to perform an additional dewatering process. At this time, the pressing was performed under control of pressure in the range of 0.1 to 4,000 kPa. The weight of the slurry was reduced to about 65% of the initial weight before dewatering by undergoing the dewatering processes twice (about 60% of the distilled water used was removed) (refer to FIG. 2).

Thereafter, the porous PTFE substrate was separated from the surface (a negative electrode layer) on which the slurry was applied, and then drying was performed at 60° C. and completed after about 2 minutes.

Thus, a negative electrode with the negative electrode layer (thickness: 35-45 μm) formed on a copper current collector was manufactured.

Example 2: Negative Electrode Manufacturing with Dewatering Process Under Reduced Pressure Applied A negative electrode was manufactured in the same manner as in Example 1, except that the dewatering process was performed by lowering the pressure to a negative pressure level.

Comparative Example 1: Negative Electrode Manufacturing without Dewatering Process Negative electrode slurry (solid content: 42.2 wt %) was prepared by adding 40 wt % of natural graphite as an active material, 0.8 wt % of carbon black as a conductive material, 0.7 wt % of styrene-butadiene rubber as a binder, and 0.7 wt % of a thickener (CMC) was added to the remaining amount of distilled water.

After the negative electrode slurry was applied, in a thickness of 300 μm, onto one surface of a copper (Cu) thin film which is a negative electrode current collector with a thickness of 10 μm, drying was performed at 60° C., which was completed after about 6 minutes.

Thus, a negative electrode with a negative electrode layer (thickness: 50-55 μm) formed on a copper current collector was manufactured.

Experimental Example 1: Evaluation of Drying Rate

Figure 2:
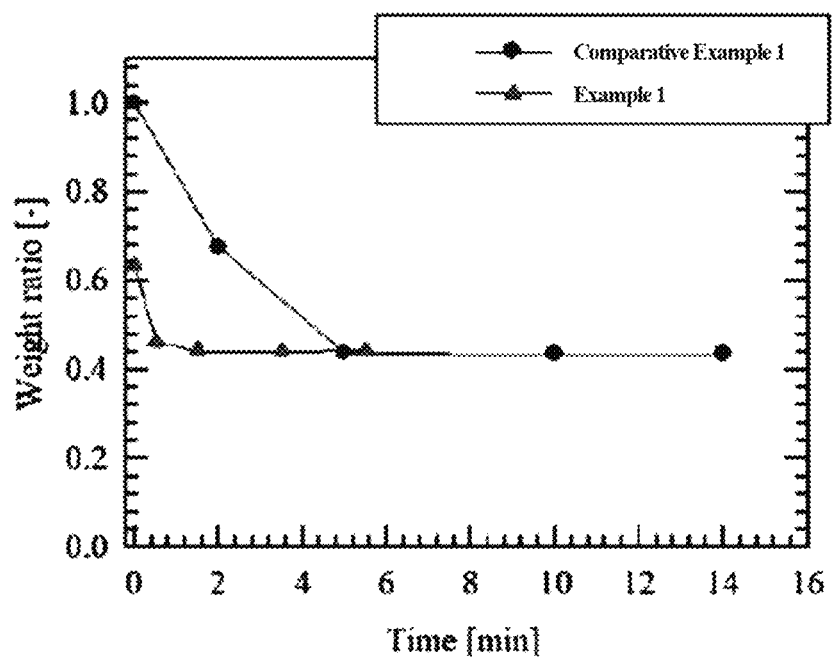
FIG. 2 is a result of comparing the drying completion time between an electrode manufacturing process that a dewatering process according to Example 1 of the present disclosure is introduced and a conventional electrode manufacturing process according to Comparative Example 1.

The drying rates of each of the negative electrodes manufactured according to Example 1 and Comparative Example 1 were compared, and the results were shown in FIG. 2.

Referring to FIG. 2, under condition that the solid content and the drying temperature in the slurry are the same, about 2 minutes were consumed for the drying in Example 1 in which drying was performed after removal of the solvent in a significant amount in the slurry through the dewatering process, whereas about 6 minutes were consumed until the solvent was dried in Comparative Example 1 to which the dewatering process was not applied, indicating that the electrode manufacturing process according to Example 1 significantly shortened the drying time.

Figure 3A:
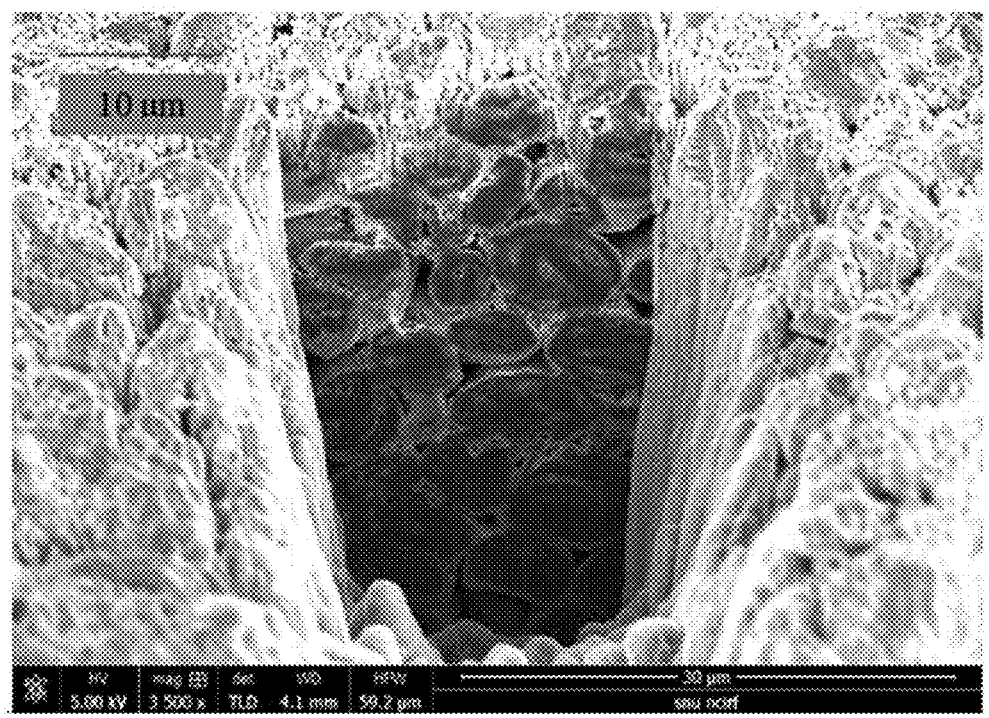
FIGS. 3A and 3B are FIB-SEM images showing distribution states of conductive materials in an electrode manufactured by a process to which a dewatering process according to Example 1 of the present disclosure is introduced and an electrode manufactured by a conventional process according to Comparative Example 1, respectively.
Figure 3B:
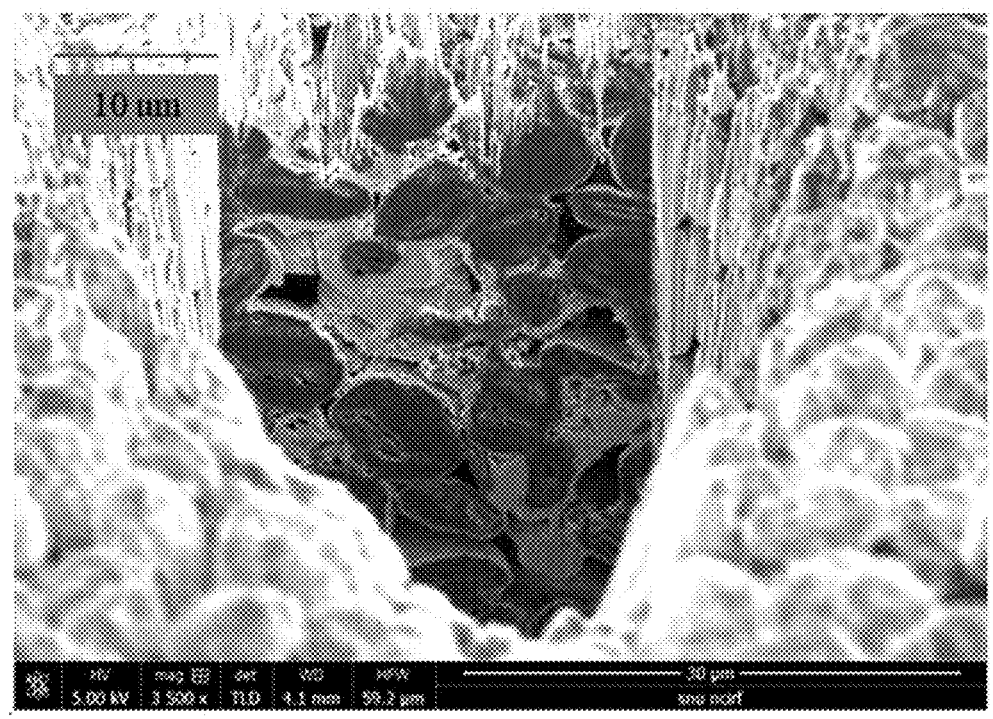

Experimental Example 2: Evaluation of Distribution of Conductive Material in Electrode Layer SEM images for the negative electrodes manufactured according to Example 1 and Comparative Example 1 are shown in FIGS. 3A and 3B, respectively.

Comparing the surface shape (FIG. 3A) of the negative electrode manufactured according to Example 1 and the surface shape (FIG. 3B) of the negative electrode manufactured according to Comparative Example 1, it was found that the pore size in an electrode layer was reduced. Specifically, the negative electrode of Example 1 had a pore size distribution of 0.01 to 45 µm and an average pore size of 0.27 µm, whereas the negative electrode of Comparative Example 1 had a pore size distribution of 0.01 to 45 µm and an average pore size of 0.30 µm, representing that the negative electrode in Example 1 has smaller and more uniform pores than that in Comparative Example 1.

Experimental Example 3: Adhesion Evaluation

The negative electrodes manufactured according to Example 1 and Comparative Example 1 were prepared as a specimen in the size of 1.5 cm×7 cm and was then adhered to glass using double-sided tape, followed by measurement of the peel strength which is force required when an electrode is removed from the double-sided tape at a rate of 3 mm per minute using UTM equipment (Comtech QC506B). The results were shown in FIG. 4.

Figure 4:
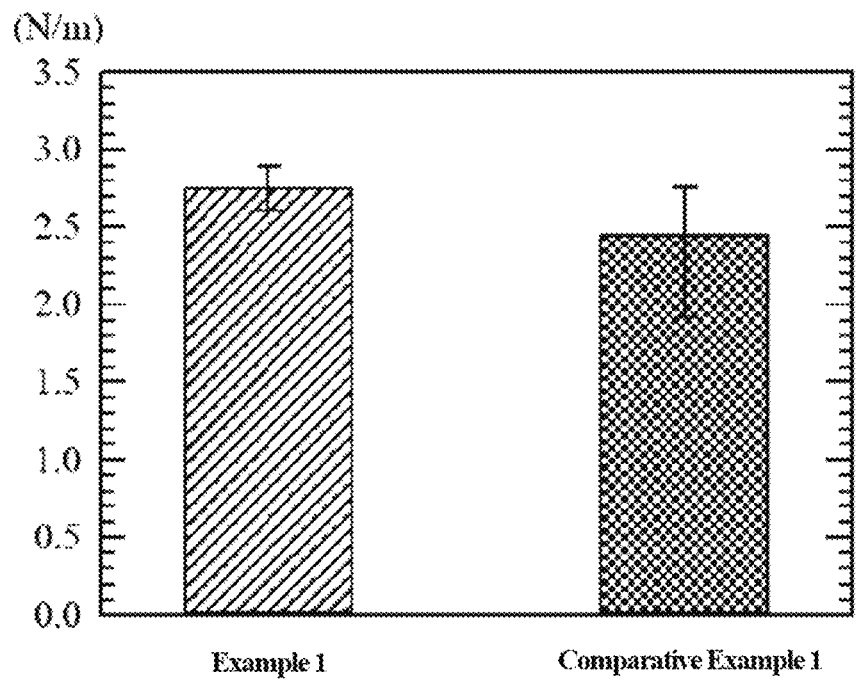
FIG. 4 is a result of comparing adhesive strength of an electrode manufactured by a process to which a dewatering process according to Example 1 of the present disclosure is introduced and an electrode manufactured by a conventional process according to Comparative Example 1.

Referring to FIG. 4, it was found that the peel strength of the electrode prepared according to Example 1 was higher than that of Comparative Example 1. In Comparative Example 1, the amount of binder positioned at the interface between the current collector and the electrode layer was decreased because the binder moved to the surface of the electrode layer while moisture in the slurry evaporated in the process of forming the electrode layer as the negative electrode slurry applied onto the current collector was dried. On the other hand, in Example 1, as the drying rate was shortened by undergoing the dewatering process, the movement of the binder in the slurry to the surface of the electrode layer was reduced, so that the adhesive strength was improved.

Experimental Example 4: Evaluation of Capacity Retention Rate

Lithium secondary battery cells, in which the negative electrodes manufactured according to Example 1 and Comparative Example 1 are included, were prepared, and the capacity in accordance with the cycle progress was measured compared to the initial capacity under conditions with 0.1 C for charging and 0.1 C for discharging at 30° C. The results were shown in FIG. 5.

Figure 5:
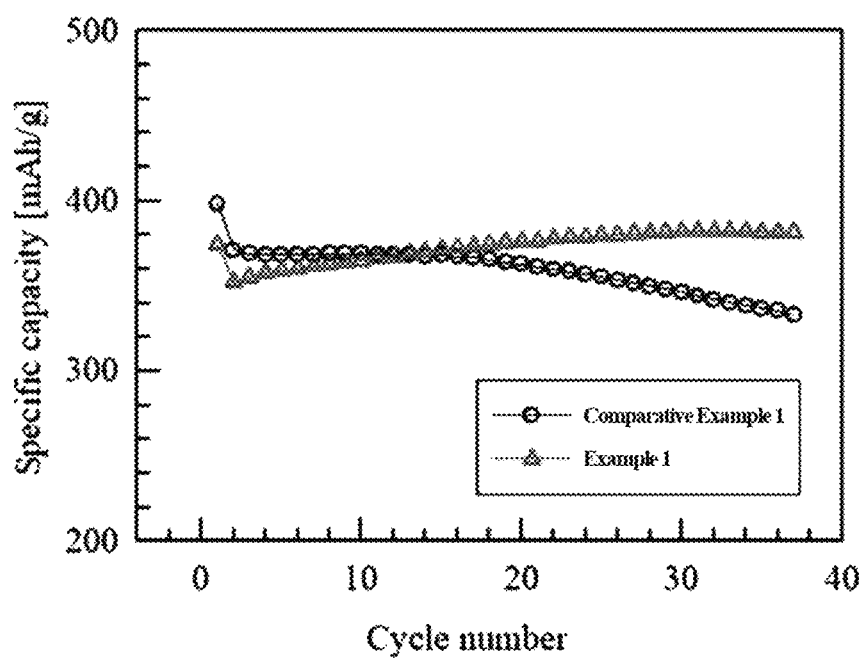
FIG. 5 is a result of comparing capacity in accordance with the charge/discharge cycle of an electrode manufactured by a process to which a dewatering process according to Example 1 of the present disclosure is introduced and an electrode manufactured by a conventional process according to Comparative Example 1.

Referring to FIG. 5, a battery cell in which the negative electrode of Example 1 was used had a slight difference in initial capacity compared to a battery cell in which the negative electrode of Comparative Example 1 was used. However, as the number of cycles increased, the capacity retention rate appeared to be higher.

In other words, it was found that the electrode of Example 1 manufactured by performing the dewatering process barely showed deterioration in electrical performance while exhibiting superior battery life compared to the electrode of Comparative Example 1.

What is claimed is:

1. A method for manufacturing an electrode, the method comprising:
   (S1) applying electrode slurry comprising an active material, a binder, a conductive material, and a solvent to one surface of a porous substrate;
   (S2) performing a dewatering process toward an opposite surface of the porous substrate to remove a first portion of the solvent in the electrode slurry to form an electrode layer by lowering pressure to a negative pressure;
   (S3) laminating an electrode current collector on the electrode layer formed on the porous substrate to form a laminate in which the porous substrate, the electrode layer, and the electrode current collector are sequentially laminated, and performing additional dewatering by pressing the laminate; and
   (S4) separating the porous substrate from the electrode layer; and
   (S5) drying the electrode layer formed on the current collector.

2. The method of claim 1, wherein pores in the porous substrate have an average size of 0.1 to 20 µm.

3. The method of claim 1, wherein porosity of the porous substrate is 50 to 95%.

4. The method of claim 1, wherein the porous substrate is in the form of a mesh made of a polymer, glass fibers, paper, metal, or ceramic.

5. The method of claim 1, wherein the active material is a positive electrode active material or a negative electrode active material for a lithium secondary battery.

6. The method of claim 5, wherein the positive electrode active material comprises any one active material particle or a mixture of two or more selected from the group consisting of $LiCoO_2$, $LiNiO_2$, $LiMn_2O_4$, $LiCoPO_4$, $LiFePO_4$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg, and Mo, and x, y, and z are each independently atomic fraction of oxide composition elements, satisfying $0 \leq x < 0.5$, $0 \leq y < 0.5$, $0 \leq z < 0.5$, and $0 < x+y+z \leq 1$).

7. The method of claim 5, wherein the negative electrode active material comprises any one active material particle or a mixture of two or more selected from the group consisting of natural graphite, artificial graphite, and carbonaceous material; lithium-containing titanium composite oxide (LTO) and metal (Me) which is Si, Sn, Li, Zn, Mg, Cd, Ce, Ni, or Fe; alloys composed of Me; oxides (MeOx) of Me; and a complex of Me and carbon.

8. An electrode manufactured by the method according to claim 1, wherein pore size distribution in the electrode is 0.005 to 60 µm and an average pore size is 0.25 to 0.29 µm.

9. A lithium secondary battery comprising the electrode of claim 8.

10. The method of claim 1, wherein the solvent comprises water.

11. The method of claim 1, wherein the dewatering process is performed at room temperature.

12. The method of claim 1, wherein the first portion comprises 40% to 80% of the solvent.

13. The method of claim 1, wherein performing additional dewatering by pressing the laminate comprises pressure in the range of 0.05 to 20,000 kPa.

14. The method of claim 1, wherein drying the electrode layer is performed at a temperature of no more than about 60° C.

15. The method of claim 1, wherein drying the electrode layer is performed for no more than about 2 minutes.

* * * * *